United States Patent
Schwartz

(10) Patent No.: US 7,411,175 B2
(45) Date of Patent: Aug. 12, 2008

(54) SPOTLIGHT MOUNTED MOTION DETECTOR

(76) Inventor: Mark Schwartz, 1352 Rowes Rd., Milford, MI (US) 48380

( * ) Notice: Subject to any disclaimer, the term of this patent is extended or adjusted under 35 U.S.C. 154(b) by 0 days.

(21) Appl. No.: 11/472,938

(22) Filed: Jun. 22, 2006

(65) Prior Publication Data

US 2007/0040109 A1  Feb. 22, 2007

Related U.S. Application Data

(63) Continuation-in-part of application No. PCT/US2005/032853, filed on Sep. 15, 2005.

(60) Provisional application No. 60/610,381, filed on Sep. 16, 2004.

(51) Int. Cl.
*G06M 7/00* (2006.01)
*B60Q 1/00* (2006.01)
*G08G 1/00* (2006.01)

(52) U.S. Cl. .......... 250/221; 340/436; 340/901

(58) Field of Classification Search ........ 250/221, 250/222.1; 340/435, 436, 555–557, 901–904, 340/961; 180/274
See application file for complete search history.

(56) References Cited

U.S. PATENT DOCUMENTS

| 3,789,358 | A |  | 1/1974 | Ellis |
| 5,319,350 | A |  | 6/1994 | DeMarco et al. |
| 5,354,983 | A |  | 10/1994 | Juds et al. |
| 5,418,359 | A |  | 5/1995 | Juds et al. |
| 5,463,384 | A |  | 10/1995 | Juds |
| 5,623,259 | A |  | 4/1997 | Giangardella |
| 6,140,918 | A | * | 10/2000 | Green et al. ........ 340/468 |
| 6,201,236 | B1 |  | 3/2001 | Juds |
| 6,377,167 | B1 |  | 4/2002 | Juds et al. |
| 2006/0163455 | A1 | * | 7/2006 | Lewin et al. ........ 250/221 |

FOREIGN PATENT DOCUMENTS

WO  2006033945  3/2006

* cited by examiner

*Primary Examiner*—Georgia Y. Epps
*Assistant Examiner*—Don Williams
(74) *Attorney, Agent, or Firm*—Gifford, Krass, Sprinkle, Anderson & Citkowski, P.C.

(57) ABSTRACT

An object-detection system for use with a police vehicle that is operative to provide an alarm to the police officer sitting in the vehicle of an approaching object. The system includes an object-detection device and at least one alarm generator in communication with the object-sensing device wherein the alarm generator is operative to generate an alarm upon receiving an electrical signal from the object-sensing device indicative of an object approaching a police vehicle.

9 Claims, 1 Drawing Sheet

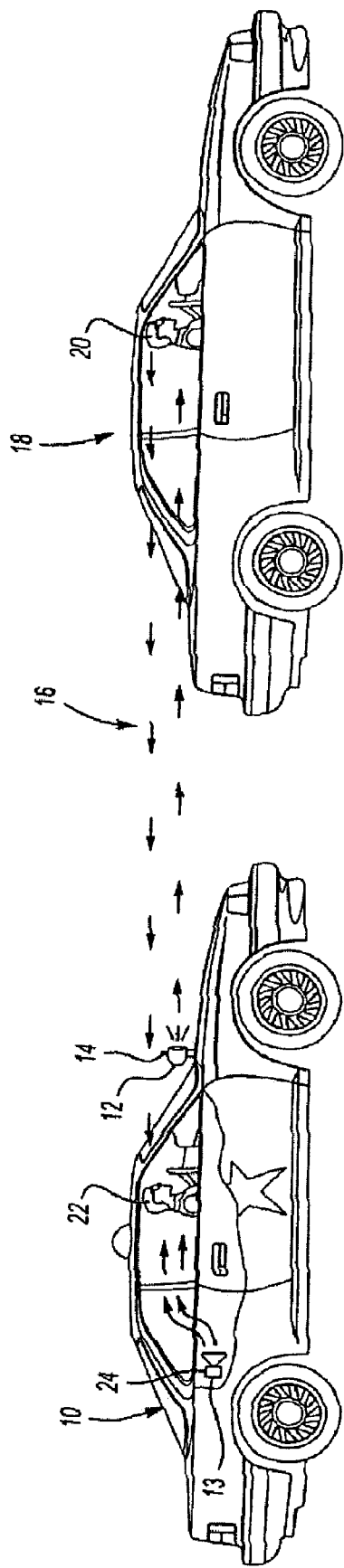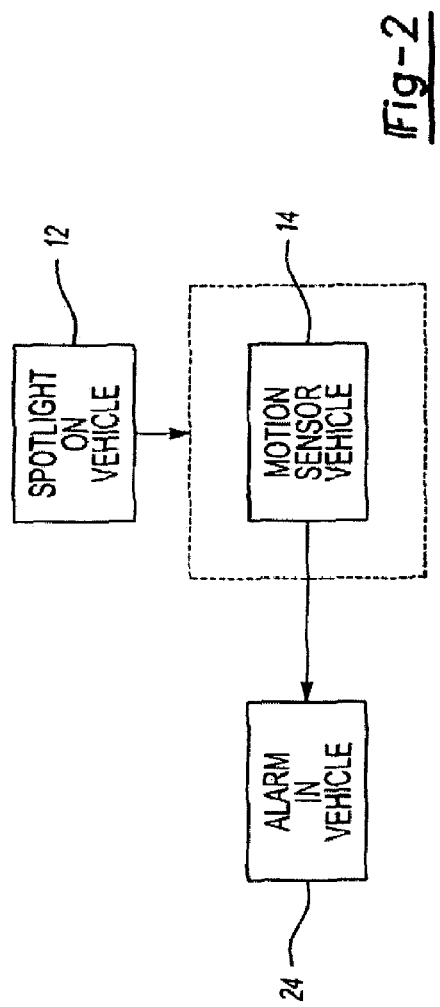

SPOTLIGHT MOUNTED MOTION DETECTOR

RELATED APPLICATIONS

This application is a continuation-in-part of PCT/US05/32853 filed Sep. 15, 2005, which claims priority of U.S. Provisional Patent Application Ser. No. 60/610,381 filed Sep. 16, 2004.

FIELD OF THE INVENTION

The present invention relates to motion detector systems and, more particularly, to a motion detector and alarm system for alerting a police officer to potential danger.

BACKGROUND OF THE INVENTION

Police officers are taught that all sorts of nasty surprises can come in motor vehicles. Fugitives, drug runners, illegal aliens, and belligerent drunks are just a few of the unpleasant possibilities that can occur at a traffic stop. Sometimes, there are warning signs; sometimes, there aren't. To make matters worse, a person in the vehicle being pulled over may be armed and may decide to be confrontational at some point during the traffic stop. In some cases, the police officer may just be in for a hard time and a few harsh words from the violator; and at other times, his or her life may actually be in danger.

In a typical nighttime traffic stop, an officer alerts the driver of the subject vehicle to pull over. Thereafter, the officer directs the illumination from the police vehicle spotlight at the rearview mirror of the subject's vehicle. The officer then exits his vehicle to inform the driver of the subject vehicle why he or she is being pulled over and thereafter receives the subject's registration and driver's license to begin writing the ticket at the police car. Once in the police car, the officer again ensures that the spotlight of the police vehicle is directed toward the rearview mirror of the subject vehicle. In this fashion, the driver of the subject vehicle is prevented from seeing what the officer is doing in the vehicle via the rearview mirror of the subject vehicle. This will prevent a driver having bad intentions from planning a sneak attack on the police officer while the officer is distracted when running a computer check or is writing a ticket.

However, under the above-described circumstances, the reflection from the rearview mirror of the subject's vehicle doesn't completely prevent the driver or passengers of the stopped vehicle from approaching the law enforcement vehicle and surprising an officer who is busy writing a ticket or running a computer check on the stopped vehicle. Accordingly, there exists a need for a means to alert an officer during a nighttime traffic stop to potential danger from a violent motorist who wants to inflict harm upon the officer while the officer is writing a traffic ticket in the police vehicle.

SUMMARY OF THE INVENTION

The present invention provides a motion detector and alarm system that has utility for alerting an officer to a person moving toward the vehicle while the officer is sitting in the vehicle.

The present invention is to be disposed on the police vehicle either as original equipment or as an aftermarket item which can be purchased directly by the police department and easily installed on the police vehicle. The motion detector system includes a motion detector mountable to a spotlight of the police vehicle. The motion detector may be disposed on the spotlight via any conventional fastening means or may be integrated as part of the spotlight as original equipment. Preferably, the motion detector is powered by the battery of the vehicle, and most preferably operates off the same power supply as the spotlight of the police vehicle. The motion detector may be equipped with a sensitivity adjustment means whereby the officer can set the sensitivity of the motion detector system to a desired level. It is appreciated that other object-detection devices may be used for such purpose which illustratively include a capacitive sensing device, a vibration sensor or even a beam which would be broken by a person's movement across the beam.

The motion detector of the present invention is in electrical communication with an audio generator that is operative to receive a signal from the motion detector to activate an alarm. Preferably, the audio generator operates off the power supply of the vehicle. Most preferably, the audio generator is comprised of a circuit integrated within the audio system or police radio of the vehicle whereby when an object moves within the sensing range of the motion detector, an electrical signal is communicated to the police radio or audio system to generate an alarm to alert the officer of potential danger.

The communication link between the motion detector and audio generator may be wired or wireless. However, if a wireless system is used, it is appreciated that the transmission frequency of the electrical signal is not such that it would interfere with any other wireless communications being received by the vehicle. Most preferably, wireless transmissions will be communicated within the same bandwidth as other wireless signals being received by the police vehicle. Alternatively, the audio generator may be a separate unit discreet from the police radio and/or audio system as described above, wherein such a motion detector system could be easily adapted to a police vehicle after market.

It is appreciated that other alerting means may be used to alert the police officer to potential danger. Such alerting means may illustratively include a visual means, a tactile means or any other means capable of being sensed by the police officer.

In an alternative embodiment, the motion detection sensor may be mounted elsewhere on the vehicle other than the spotlight of the vehicle such as near the front grill of the police vehicle, preferably adjacent the driver's side of the police vehicle whereby a disgruntled motorist would be easily detected upon approaching the vehicle.

BRIEF DESCRIPTION OF THE DRAWINGS

A better understanding of the present invention will be had upon reference to the above description when read in conjunction with the accompanying drawings in which like parts are given like reference numerals and wherein:

FIG. 1 is a perspective view of the motion detector system disposed on the police vehicle; and FIG. 2 is a block diagram illustration of the inventive motion detection system.

DETAILED DESCRIPTION OF THE INVENTION

Now referring to the drawings and as can best be seen in FIG. 1, a law enforcement vehicle or police vehicle 10 is provided with a spotlight 12 that is standard equipment on most law enforcement vehicles. A motion detector 14 is mounted to the spotlight 12. As already indicated, the motion detector 14 can be a part of a kit to be mounted to the spotlight 12 as an aftermarket product or it could be integral with the spotlight 12 and provided as original equipment with the vehicle.

As indicated by the arrows 16 in FIG. 1, the spotlight 12 of the law enforcement vehicle 10 is directed toward the rearview mirror (not shown) of a stopped vehicle 18. This is standard procedure to prevent the driver 20 or passengers of the stopped vehicle 18 from using their rearview mirror to see where the law enforcement offer 22 is and what he is doing. This use of the spotlight 12 also properly positions the motion detector 14 so that it is lined up with the stopped vehicle 18 so that movement from the stopped vehicle 18 will be within the range of detection of the motion detector 14.

Thus if the driver 20 of the stopped vehicle 18 or a passenger were to exit from the vehicle 18 and move toward the law enforcement vehicle 10, the motion detector 14 would sound an alarm 24 and alert the law enforcement officer 22 to the approaching potential danger.

As best seen in FIG. 2, the spotlight 12 and motion detector 14 can be electrically connected as shown. The motion detector 14 is also electrically connected to the alarm 24 positioned in the law enforcement vehicle 10. The alarm 24 could be part of the radio system (not shown) already provided in the vehicle 10.

The foregoing description and figures are provided as illustrative of an embodiment of this invention and are not intended to be all-inclusive. It is understood that various changes to the central components and concepts of the system may be resorted to without departing from the spirit of the invention or scope of the claims as presented.

I claim:

1. An object detection system for use in alerting a police officer to an approaching object while the officer is sitting within a police car, the system comprising:
    an object-sensing device disposed on a spotlight of the police vehicle, the object-sensing device operating to only sense an object approaching the front the police vehicle; and
    an alarm generator in communication with the object-sensing device, said alarm generator operative to receive an electrical signal from the object-sensing device and thereafter to generate an alarm to alert the police officer of an approaching object.

2. The object detection system of claim 1, wherein the object-sensing device is a motion detector.

3. The object-detection system of claim 1, wherein the alarm generator is a police radio.

4. A method of alerting a police officer to an approaching object while an officer is sitting in a police vehicle, said method comprising the steps of:
    disposing an object-sensing device on a spotlight of the police vehicle, the object-sensing
    device operating to only sense an object approaching the front the police vehicle;
    disposing an alarm generator on the police vehicle; and
    providing a communication link between said object-sensing device and said alarm generator whereby upon detecting an approaching object, the object-sensing device transmits an electrical signal to the alarm generator that causes the alarm generator to provide an alarm to the police officer.

5. The method of claim 4, wherein the object-sensing device is disposed on the vehicle as original equipment.

6. The method of claim 4, wherein the object-sensing device is disposed on the vehicle as an aftermarket product.

7. An object detection system for use in alerting a police officer to an approaching object while the officer is sitting within a police car, the system comprising:
    an object-sensing device disposed on a spotlight of the police vehicle, the spotlight being movably mounted to the vehicle so that the spotlight may be aimed in a predetermined direction, the object-sensing device operating to only sense an object approaching the police vehicle from direction in which the spotlight is aimed; and
    an alarm generator in communication with the object-sensing device, said alarm generator operative to receive an electrical signal from the object-sensing device and thereafter to generate an alarm to alert the police officer of an approaching object.

8. The object detection system of claim 7, wherein the object-sensing device is a motion detector.

9. The object-detection system of claim 7, wherein the alarm generator is a police radio.

* * * * *